Feb. 2, 1960  B. E. DIXSON ET AL  2,923,500
DISCRIMINATOR FOR USE WITH AIRCRAFT AUTO PILOTS
Filed May 5, 1950
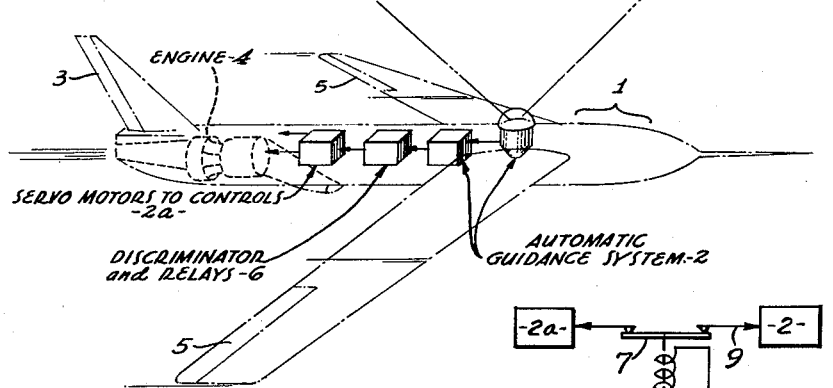
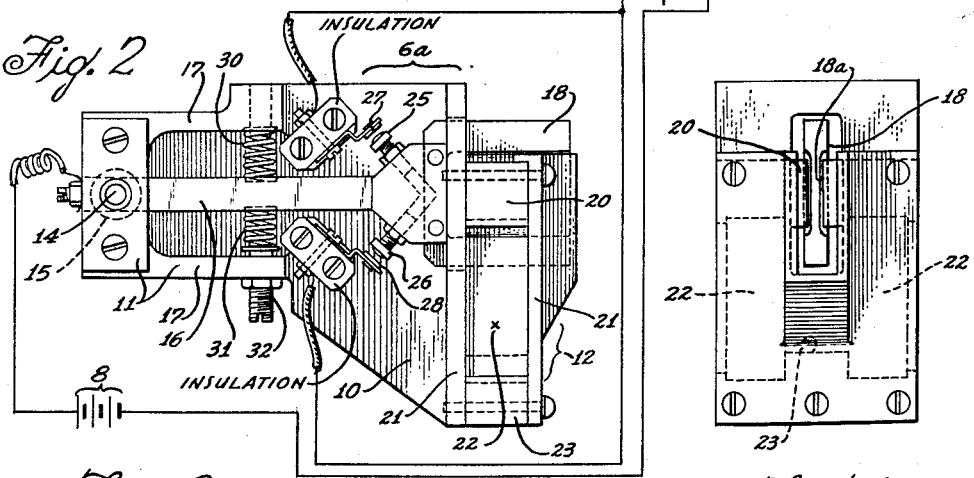
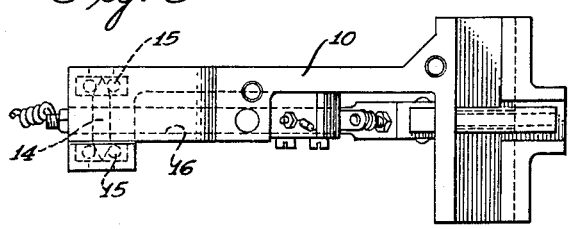
INVENTORS:
BRUCE E. DIXSON
SYDNEY E. WESTMAN
BY Herbert E. Metcalf
THEIR PATENT ATTORNEY

United States Patent Office 2,923,500
Patented Feb. 2, 1960

2,923,500

DISCRIMINATOR FOR USE WITH AIRCRAFT AUTO PILOTS

Bruce E. Dixson, Los Angeles, and Sydney E. Westman, Inglewood, Calif., assignors to Northrop Corporation, a corporation of California Application May 5, 1950, Serial No. 160,134

2 Claims. (Cl. 244—77)

The present invention relates to automatic guidance systems for moving vehicles, and more particularly to an automatic means for discriminating against unwanted motions of said vehicle, so that such motions will not be able to cause anomalous action of said guidance system on said vehicle.

A guided missile, for example, may be flying under the guidance and control of an automatic celestial navigation system, signals from which are supplied to servo-motors operating flight controls of the missile. As it is customary, at least during mid-course flight, for the vehicle to be flying at a constant altitude under the control of an altimeter, there is no need, in the guidance system itself, for any device responsive to vertical accelerations. However, many automatic guidance systems do incorporate devices, such as bubble levels or plumb-bobs for example, that are properly responsive to accelerations in other directions; but which may be improperly actuated by vertical accelerations to the extent that improper output signals can be given to controls of the craft.

It is an object of the present invention to provide a means for rendering an automatic guidance system for a vehicle inoperative during periods when vertical accelerations are being experienced by the vehicle of sufficient amplitude to materially affect the accuracy of the guidance system.

It is another object of the invention to provide an accelerometer switch, suitable for use between an automatic guidance system for a vehicle and the controls of the vehicle, to isolate the guidance system from the controls under vertical accelerations sufficiently large to affect the accuracy of the guidance system.

It is a further object of the invention to provide a simple and effective accelerometer switch.

In brief, the invention comprises an accelerometer mass pivoted to move vertically only, together with means for adjusting the response value, and with magnetic damping means. Electrical contacts are positioned to be actuated by accelerometer movement. The accelerometer is mounted in a vehicle, such as a guided missile, having an automatic guidance system normally operating the directional flight control of the missile; and circuits are provided whereby displacement of the accelerometer, during vertical accelerations of a pre-determined gravity (g) value in either direction, will isolate the guidance system from the controls of the vehicle; this isolation being terminated upon cessation of the vertical acceleration response of the accelerometer.

The invention will be more fully understood by reference to the drawings in which, Figure 1 is a schematic perspective view of a guided missile embodying the present invention.

Figure 2 is a side view of a vertical accelerometer used in the system shown in Figure 1.

Figure 3 is a top view of the accelerometer of Figure 2.

Figure 4 is an end view of the accelerometer of Figure 2.

Referring first to Figure 1, a guided missile 1 is equipped, for example, with an automatic celestial navigation system 2 operating a servo-motor system 2a connected to the controls of the missile. In this particular system, the rudder 3 of the craft, and the throttle of the craft engine 4 are under the direct control of the navigation system 2 for course guidance, the elevons 5 being under the control of a leveling system (not shown) for lateral control and under the control of an altimeter (not shown) for altitude control.

In order that the throttle and rudder may not be operated when vertical accelerations affect the navigation system 2 to the point that inaccurate course signals are sent out therefrom, we provide, between the guidance system 2 and the servos 2a, a discriminator 6 of unwanted motions, which embodies a preferred form of vertical accelerometer 6a as shown in Figures 2, 3 and 4. Discriminator 6 also contains various relays, such as indicated at 7, for example, responsive to the electrical condition of the accelerometer 6a to disconnect and reconnect the guidance system 2 from and to the servomotor system 2a.

Referring now to Figures 2, 3 and 4, a side plate 10 supports at one end a U-shaped pivot frame 11 and at the other end a magnet assembly 12.

A pivot 14 is mounted in frame 11 at a right angle to side plate 10, preferably on ball bearings 15, and this pivot supports a mass arm 16 extending between the legs 17 of the U frame 11 along one side of the side plate 10 to terminate in a mass vane 18. The accelerometer is mounted in the missile so that pivot 14 is horizontal with respect to the missile and with vane 18 in the vertical plane of the craft.

Magnet assembly 12 comprises a pair of opposed pole pieces 20 one on each side of, but not touching, vane 18. These pole pieces are held in fore and aft clamp members 21, which also support a pair of bar magnets 22 of the permanently magnetized type in contact with pole pieces 20 and with a magnetic bridge piece 23 connecting the lower ends of magnets 22. Thus there is formed a magnetic circuit with the vane 18 in the airgap thereof. At the pivot end of vane 18 are positioned an upper electrical vane contact 25 and a lower vane electrical contact 26 mounted at a 45° angle to vane arm 16; these vane contacts cooperating with upper and lower frame contacts 27 and 28, respectively, supported by side plate 10. These latter contacts are adjustable and positioned so that all contacts are open when the vane arm and vane are in a neutral position.

This neutral position is provided by two, in this case, identical spring elements 30 and 31 positioned respectively above and below vane arm 16. The compression of these springs is controlled by spring adjustment screw 32. It is preferred that arm 16 be aligned to be parallel to the longitudinal axis of the missile, and that the spring tension be proportioned to permit movement of arm and vane a sufficient amount to cause the opposed contacts 25—27 and 26—28 to close on one side or the other of the arm upon a pre-determined vertical acceleration, such as ±0.1 g. for example. Under these circumstances the top contacts will close at 0.9 g. and the lower contacts will close at 1.1 g. The contacts 27 and 28 are then connected through a power supply 8 to relay 7 that opens the course control circuits 9 between the guidance system 2 and the servo system 2a. As is customary, the servomotor connections to the controls are irreversible so that the controls stay in their last controlled position until connection between the guidance system and the servo system is restored by the cessation of the unwanted acceleration and the return of the arm 16 and vane 18 to the neutral position.

Damping of the accelerometer is provided by the magnetic field produced by the magnet assembly 12 passing through vane 18. As the vane moves, eddy currents are set up in the vane to oppose movement thereof, thus providing a magnetic damping force. To the end that the damping be efficient, we prefer to have the magnetic field act only on a relatively thin center portion 18a of the vane 18, the remainder of the vane being thick to provide the desired mass.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

We claim:

1. In an aircraft guided by an automatic guidance system electrically connected to operate directional and speed controls of said aircraft, a vertical accelerometer mounted in said aircraft, said accelerometer comprising an element mounted to move in response to vertical accelerations only, elastic means positioned to hold said element in a neutral position and positioned to resist movement of said element away from said neutral position, a non-conductive magnetic vane mounted on said element and moveable therewith, said vane being mounted to be parallel to the direction of movement of said element, means for directing a magnetic field through said vane at right angles to the direction of movement thereof, electrical contacts positioned to be operated by movement of said element away from neutral a predetermined distance, and means connecting said contacts when operated by movement of said element to isolate said guidance system from said controls.

2. Apparatus in accordance with claim 1 wherein said electrical contacts are provided in a position to be operated by movement of said element by predetermined amounts in either direction from said neutral.

References Cited in the file of this patent

UNITED STATES PATENTS

| | | |
|---|---|---|
| 2,310,213 | Buchanan | Feb. 9, 1943 |
| 2,487,793 | Esval et al. | Nov. 15, 1949 |
| 2,498,064 | Borell | Feb. 21, 1950 |

FOREIGN PATENTS

| | | |
|---|---|---|
| 619,055 | Germany | Sept. 23, 1935 |